United States Patent [19]

Trussler

[11] Patent Number: 5,102,005
[45] Date of Patent: Apr. 7, 1992

[54] UNDERGROUND STORAGE TANK ASSEMBLY AND METHOD FOR FABRICATING THE SAME

[75] Inventor: Jared A. Trussler, Santa Barbara, Calif.

[73] Assignee: Trusco Tank, Inc., San Luis Obispo, Calif.

[21] Appl. No.: 456,521

[22] Filed: Dec. 26, 1989

Related U.S. Application Data

[60] Division of Ser. No. 334,676, Apr. 6, 1989, which is a continuation-in-part of Ser. No. 99,546, Sep. 22, 1987, abandoned, which is a continuation-in-part of Ser. No. 35,412, Apr. 6, 1987, abandoned.

[51] Int. Cl.⁵ .............................................. B65D 87/00
[52] U.S. Cl. ................................. 220/4.12; 220/4.13; 220/445; 220/565
[58] Field of Search .............. 220/1 B, 5 A, 469, 4.12, 220/4.13, 445, 85 B, 455, 565

[56] References Cited

U.S. PATENT DOCUMENTS

| | | | |
|---|---|---|---|
| 3,848,765 | 11/1974 | Dürkop | 220/469 X |
| 4,110,239 | 8/1978 | Kidd | 340/605 |
| 4,523,454 | 6/1985 | Sharp | 220/449 X |
| 4,524,609 | 6/1985 | Sharp | 220/85 B X |
| 4,537,328 | 8/1985 | Keesee | 220/445 |
| 4,568,925 | 2/1986 | Butts | 340/605 |
| 4,607,522 | 8/1986 | Sharp | 220/449 X |
| 4,640,439 | 2/1987 | Palazzo | 220/445 |
| 4,644,627 | 2/1987 | Palazzo | 29/423 |
| 4,651,893 | 3/1987 | Mooney | 220/469 X |
| 4,653,312 | 3/1987 | Sharp | 220/469 X |
| 4,655,367 | 4/1987 | Palazzo | 220/445 |
| 4,660,738 | 4/1987 | Ives | 220/5 A X |
| 4,744,137 | 5/1988 | Palazzo | 220/445 X |
| 4,780,946 | 11/1988 | Palazzo | 220/445 X |
| 4,780,947 | 11/1988 | Palazzo | 220/445 X |
| 4,844,287 | 7/1989 | Long | 220/1 B X |
| 4,859,262 | 8/1989 | Sharp | 220/469 X |
| 4,869,386 | 9/1989 | Sharp | 220/469 X |

*Primary Examiner*—Steven M. Pollard
*Attorney, Agent, or Firm*—Blakely, Sokoloff, Taylor & Zafman

[57] ABSTRACT

An underground storage tank assembly and method for fabricating the same are disclosed. A steel primary fluid storage tank is provided having an outer, peripheral surface. A secondary fluid storage container being formed of curable plastic material and having a substantially smooth inner surface is tightly secured about the outer, peripheral surface of the primary fluid storage tank. The interstitial spaces formed between the outer surface of the primary container and the inner surface of the secondary container permit the desired migration of fluid therethrough to allow the detection of any fluid leaking through the primary tank or secondary tank. Various methods for forming the secondary fluid storage container are disclosed. The outer surface of the primary tank and/or the inner surface of the secondary fluid storage container may be textured for applications requiring enhanced fluid migration.

7 Claims, 9 Drawing Sheets

UNDERGROUND STORAGE TANK ASSEMBLY AND METHOD FOR FABRICATING THE SAME

This is a divisional of application Ser. No. 07/334,676, filed Apr. 6, 1989, which is a continuation-in-part of my prior application entitled "Secondary Containment Capsule for Underground Storage Tank and Method for Fabricating the Same", Ser. No. 099,546, filed Sept. 22, 1987, now abandoned, which is a continuation-in-part of my prior application also entitled "Secondary Containment Capsule for Underground Storage Tank and Method for Fabricating the Same", Ser. No. 035,412, filed Apr. 6, 1987, now abandoned.

BACKGROUND OF THE INVENTION

1. Field of the Invention

The present invention relates to the field of underground storage tanks and, more specifically, to an apparatus and method for providing added leakage protection and leakage detection capabilities for underground storage tanks.

2. Description of the Related Art

In recent years, concerns have been raised over the environmentally hazardous leakage of petroleum products and other materials from insecure underground storage tanks. Several states have adopted laws requiring new underground tanks to provide some form of secondary containment to prevent leakage from single wall tanks Some state codes also require that such new tanks incorporate a leak detection means capable of detecting leakage of the stored product from the primary containment means into the secondary containment means or leakage of ground water or other liquids from outside the secondary containment means through the secondary container to provide a warning of any leakage before leakage through both first tank, creating in essence, a double walled tank with a leakage collection space therebetween. Currently, the most common manner in which leakage is being prevented is through the use of a steel secondary containment vessel. However, this configuration is not as effective in reducing leakage because the secondary steel shell is still susceptible to corrosion in the event of coating damage Furthermore, use of a steel on steel configuration is expensive. Other types of such double walled tanks are known in the prior art.

U.S. Pat. Nos. 4,523,454 and 4,607,522, both issued to B.R. Sharp disclose underground storage tank systems for liquids having secondary containment capability and leakage detection capability utilizing detecting fluid. Borh systems disclosed utilize a flexible jacket to encase a rigid inner tank.

U.S. Pat. No. 4,561,292 issued to Rignale, discloses a tank having two fiberglass walls, the second fiberglass wall being formed by applying a fiberglass layer over a grid of plastic mats separated by fiberglass ribs.

U.S. Pat. No. 4,537,328, issued to K.M. Keesee et. al., discloses a tank with a steel inner tank and a fiberglass outer tank, the fiberglass outer tank being formed by applying fiberglass sheets over a grid of semicircular PVC pipe segments attached to the surface of the inner steel tank.

U.S. Pat. No. 4,744,137, issued to P.T. Palazzo, discloses a method for making a double wall storage tank In the method disclosed by Palazzo a mold member is formed having a cylindrical configuration generally similar to but somewhat larger in diameter than the configuration of the inner tank. The sidewall surface of the mold has a plurality of depressions each extending generally radially inwardly. A moldable, hardenable material is then applied over the sidewall surface. It is desired for the moldable, hardenable material to conform to the mold sidewall surface and depressions therein. A cylindrical sheath is thereby formed during the molding process with a plurality of projections extending generally radially inwardly. When the cylindrical sheath has cured the sheath is removed from the mold by forming an opening or slit through the sheath, the opening extending the full axial length of the sheath. This cylindrical sheath is then introduced over the inner tank, the radially inward projections of the sheath spacing the sheath from the outer surface of the inner tank to permit passage of liquid therebetween. Migration of fluid is important in order to allow the detection of any leakage of fluid through either the primary tank or the secondary tank into the space between the inner tank and the cylindrical sheath.

The Palazzo method works well when carefully carried out. However, the resulting tank must be handled appropriately, as the fiberglass sheath is only supported at each projection. Thus, the tank must be carefully handled in shipment and when placed on the ground, or cracking may occur due to the high stresses in the outer sheath at the projections. This problem is also aggravated by any failure of the depressions in the mold to fill during the molding of the outer sheath, requiring care both in cleaning the mold, particularly the depressions therein before starting, and in assuring that the depressions properly fill during the molding process, as merely wrapping the mold with resin saturated fiberglass will not assure that the depressions properly fill, particularly with depressions of the size and shape of those disclosed in U.S. Pat. No. 4,744,137.

SUMMARY OF THE INVENTION

An underground storage tank assembly and method for fabricating the same are disclosed. A steel primary fluid storage tank is provided having an outer, peripheral surface. A secondary fluid storage container being formed of a reinforced curable plastic material and having a substantially smooth inner surface is tightly secured about the outer, peripheral surface of the primary fluid storage tank. The interstitial spaces formed between the outer surface of the primary container and the inner surface of the secondary container permit the desired migration of fluid therethrough to allow the detection of any fluid leaking through the primary tank or secondary tank. Various methods for forming the secondary fluid storage container are disclosed. The outer surface of the primary tank and/or the inner surface of the secondary fluid storage container may be textured for applications requiring enhanced fluid migration.

BRIEF DESCRIPTION OF THE DRAWINGS

FIG. 3b is a side view of the male mold means of FIG. 3a.

The same elements or parts throughout the figures of the drawings are designated by the same reference characters, while equivalent elements bear a prime designation.

DETAILED DESCRIPTION OF THE INVENTION

1. General Configuration

Figure 1:
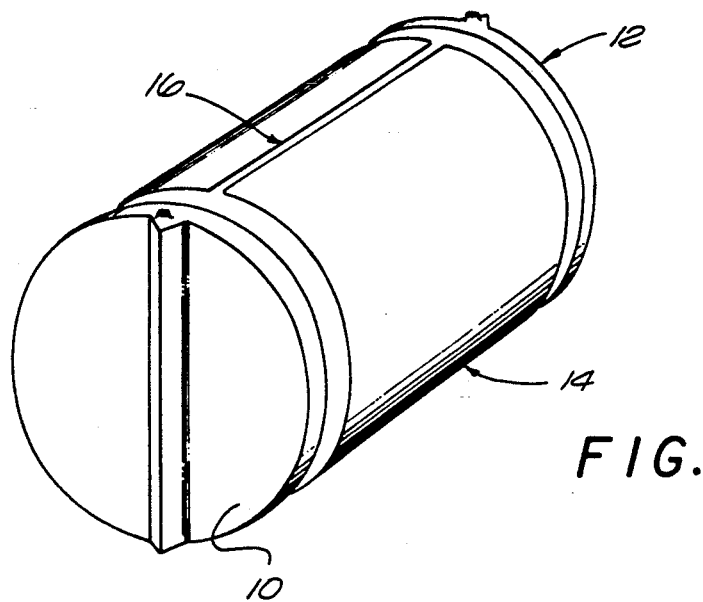
FIG. 1 is a schematic view of the apparatus of the present invention.
Figure 8:
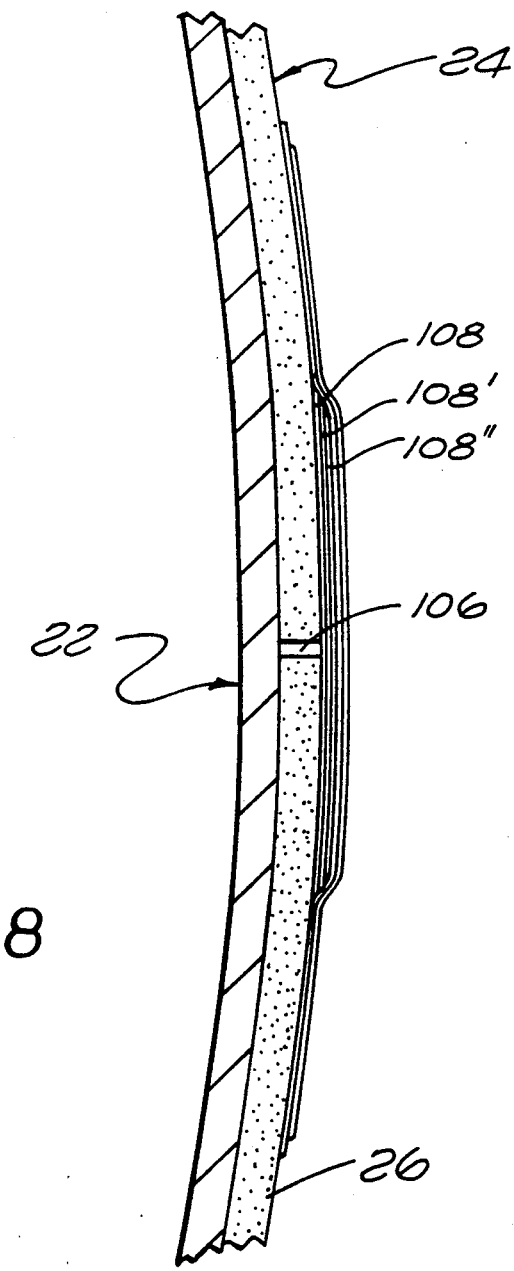
FIG. 8 is a cross-sectional view of a portion of the longitudinal seam, illustrating the use of fiber-reinforced matting.

Referring to the drawings and the characters of reference marked thereon, FIG. 1 is a reproduction of FIG. 8 of the parent application (Ser. No. 099,546), illustrating an embodiment of the present invention in which the secondary containment capsule (e.g. secondary fluid storage container) comprises end caps 10 and 12 and a single axial segment 14. The following description of this embodiment is also essentially duplicated from the parent application. (The numeral designations have, however, been modified.) In this embodiment, axial segment 14 may initially be formed on a mold such that it has a wall thickness substantially less than its intended finished wall thickness to facilitate removal from the mold and application of axial segment 14 to the primary tank, or, preferably, axial segment 14 can be molded to its final finished thickness. For example, axial segment 14 may be molded to have an initial wall thickness of between 25% and 100% of the intended finished wall thickness of the secondary containment capsule. After axial segment 14 is substantially cured, a longitudinal cut 16 is made along one side of the axial segment 14. Even if the thickness of axial segment 14 is the full intended wall thickness, axial segment 14 is flexible enough that it can be removed from its mold and wrapped around the primary tank, once cut 16 is made, by bending apart the edges of cut 16. The mounting of axial segment 14 onto the primary tank is thereby greatly facilitated. After axial segment 14 (or a number of shorter segments) has been tightly wrapped around the primary tank, adhesive tape, such as polyethylene tape, can be applied over cut 16 to seal the cut edges together. For this purpose, tape having a width of ¾" is convenient. The elasticity of axial segment 14 biases the edges together such that additional means to hold the cut edges together are generally not required End caps 10 and 12 which may also initially be molded to only about 25% of their finished thickness, but preferably molded to their final thickness, are mounted on the ends of the primary tank, and the joints between end caps 10 and 12 and axial segment 14 may also be sealed with polyethylene or other adhesive tape. Fiberglass, in the form of resin impregnated mats or filaments or a chopped fiber and resin mixture, is then applied over the joint areas welding end caps 10 and 12 and axial segment 14 together. Preferably, a weld area approximately 8" wide is formed. If the capsule was initially molded to a thickness less than its intended finished thickness, additional fiberglass will be applied over the whole outside surface of the secondary containment capsule, building up the wall thickness of the secondary containment capsule to its final value. Preferably, in this case, a chopped fiber and resin mixture is applied with a chopper gun while the tank is slowly being rotated on rollers.

Fluid migration can be enhanced by texturing the inside surfaces of the secondary containment capsules, especially along the lower sections of the capsules on which the primary tank rests. Such surface texturing may be molded into a segment if a male mold is used, as the axial splitting of the segments allows easy removal from the mold in spite of the texturing, or a texturing agent may be applied to the segment after it has been formed.

Molded textures may include patterns of bumps, ridges, grooves or other projections or depressions that maintain a space between the secondary capsule and the primary tank. Such texturing allows a tight fit to be maintained between the secondary capsule and the primary tank, allowing the secondary capsule to obtain structural support from the primary tank while still providing for adequate fluid migration Such molded textures are formed by forming appropriate patterns in the surface of the male mold used to form the segment. When fiberglass is applied to the mold, a corresponding textured surface will result on the inside surface of the molded segment.

If a texturing agent is used, the texturing agent may comprise a mixture of glass fibers and resin, or a mixture of solid particles such as crushed rock, pea gravel, metal pellets, crushed walnut shell, glass beads, sand and resin or any other binder which will adhere to the interior walls of the secondary containment capsule. The texturing agent may be applied evenly or in a furrowed pattern to only the lower portions of the inside surfaces of the secondary containment capsule segments, or the texturing agent may be applied to the entire inside surfaces.

Texturing may also be accomplished by grooving or abrading the surface with a grinding or milling tool or by abrasive blasting such as sand blasting. Texturing may also be applied to the outside surface of the primary tank in addition to or instead of the inside of the secondary containment capsule, or the primary tank may be made of a material such as diamond plate steel that incorporates a textured pattern in its surface.

Figure 3A:
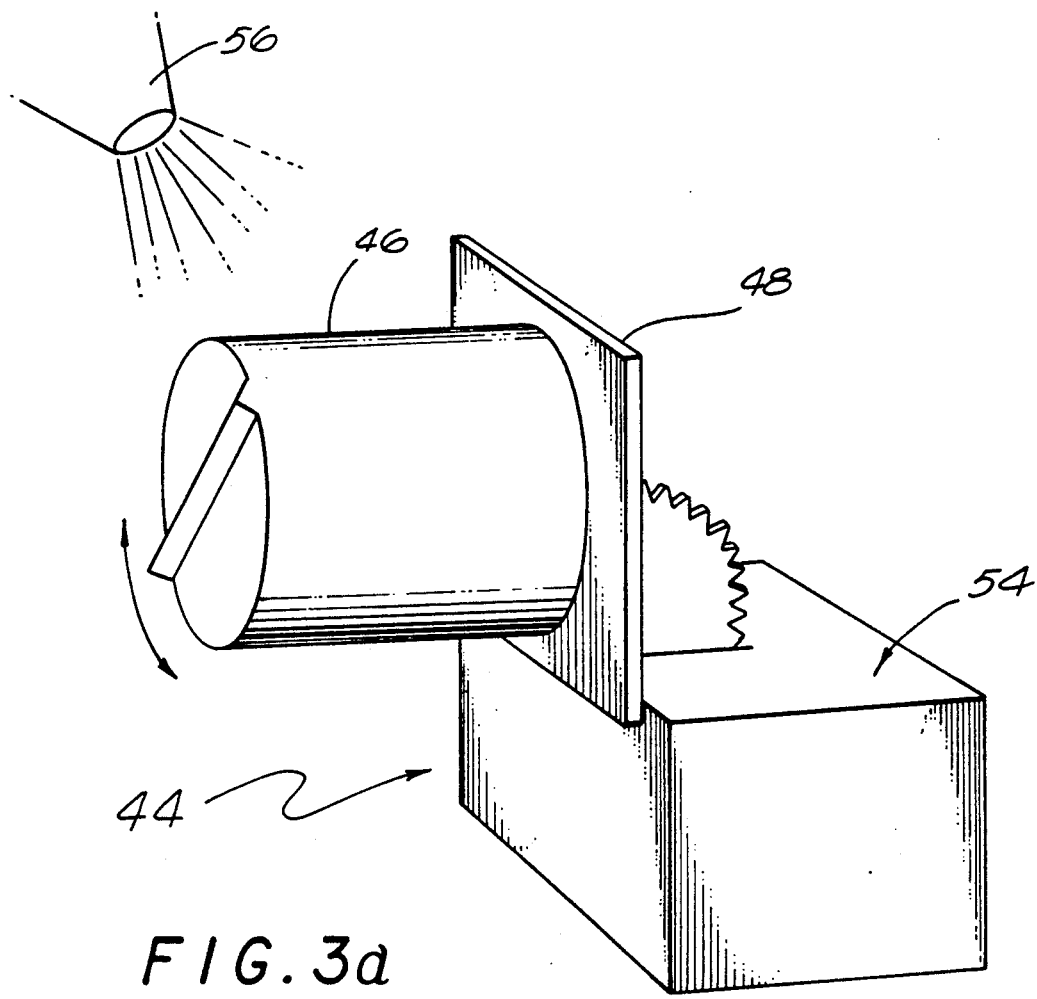
FIG. 3a is a perspective view of one male mold means used to form the secondary fluid container of the present invention.
Figure 3B:
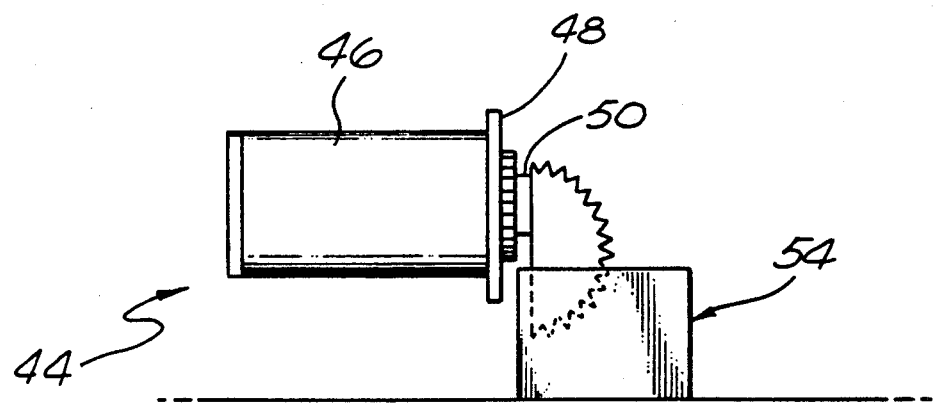

Referring now to FIGS. 3a and 3b, which are essentially FIGS. 5a and 5b of the parent application, the secondary fluid storage container may be formed by utilization of a male mold means, designated generally 44. The male mold 46 is mounted to a mounting plate 48 attached to an arbor 50 of a rotating positioner, generally designated 54. Male mold 46 has a substantially smooth surface.

Rotating positioner 54 allows rotation of the male mold 46 around an axis whose orientation can be changed from a horizontal to a vertical position, or any orientation therebetween. Resin impregnated fiberglass mats or a chopped fiberglass mixture are applied by applicator 56 to the outside of male mold 46 as it is being rotated around its longitudinal axis by rotating positioner 54. Slow rotation of male mold 46 insures that an even fiberglass layer is applied and that the applied fiberglass layer retains an even thickness during curing.

The axial segment or middle section 14 of the secondary container may initially be formed on the mold such that it has a wall thickness substantially less than its intended finished wall thickness to facilitate removal from the mold 46 and application of middle section 14 to the primary tank or middle section 14 can be molded to its final finished thickness Thus, in the parent application, an apparatus and process for making untextured as well as textured secondary fluid storage containers was described, such texturing for enhancing fluid migration. The present application provides additional disclosure of these texturing techniques while expanding on the untextured methods and applications.

Figure 2:
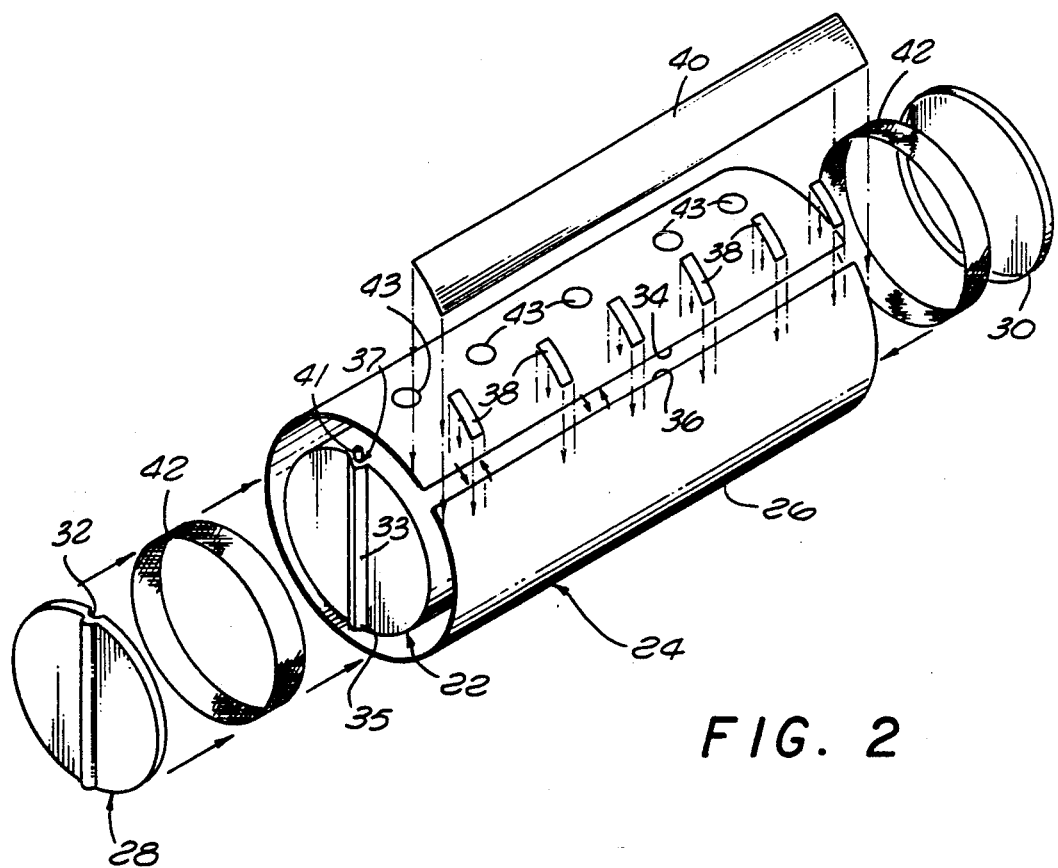
FIG. 2 is an exploded, more detailed schematic view of the apparatus of the present invention.

Referring now to FIG. 2, an exploded schematic view of a new preferred embodiment of a double wall storage tank 20 of the present invention is illustrated. The primary storage tank 22 is typically a single-walled steel structure fabricated in a conventional manner for containing liquid products underground. Primary storage tank 22 is enveloped by a secondary storage container, designated generally as 24, formed of a curable plastic material, preferably fiberglass reinforced polyester resin. The secondary storage container 24 comprises an assembly of a substantially cylindrical middle section 26 and round first and second end caps 28, 30. At least the middle section 26 of secondary storage container 24 has a substantially smooth inner surface which, as shall be subsequently seen, lies flat against the smooth outer surface of the inner steel tank 22 like that of one form of the embodiment of FIG. 1.

In use, the apparatus 20 preferably includes leak-detecting means having access to the inside of the bottom of the secondary storage container 24, in the embodiment shown, through a conduit 32 for a monitor tube 33 extending from the top to the bottom of the secondary storage container, when fully assembled. The monitor tube 33 is welded to the primary tank 22 at a lower location 35 and at an upper location 37 through a 2" coupling 41. Alternatively, a pipe may pass through the steel primary tank 22 and be welded thereto at the top and bottom of the steel tank 22 to provide a similar access. If a leak occurs, the leaking fluid will gather at the bottom of the secondary storage container 24 and appear in the bottom of the conduit 32, thereby triggering a leak-detection device. Such a leak detecting device may comprise any of various devices well known in the art.

The secondary storage container has a cylindrical center section 26 formed on a smooth male mold, then cut or split longitudinally and removed therefrom, and then clamped tightly over the primary storage tank 22. The longitudinal edges 34, 36, after trimming, are fixedly joined, preferably initially by patches 38 of fiber-reinforced plastic, and subsequently with additional resin impregnated matting 40. The end caps 28, 30 are also fixedly joined to the middle section 26 by resin impregnated fiberglass mat 42. The middle section 26 has openings 43 at desired locations for accommodating nozzles located on the primary tank 22, as will be subsequently described. Any gaps between the nozzles and openings 44 may be sealed by application of several layers of resin impregnated fiberglass mat or a chopped fiberglass resin mixture.

As noted in the Background of the Invention, it had previously been believed that to provide migration of fluid to allow leakage detection, it is necessary to provide the secondary fluid storage container which covers the primary tank with small projections or other spacers to space apart the inner and outer walls, or to provide a fluid pervious spacing material therebetween. However, the present Applicant has discovered that sufficient fluid migration may be achieved without the requirement of the spacers or fluid pervious spacer material. In particular, the use of a male mold with a substantially smooth surface to fabricate an outer storage container shell having a smooth inner surface, and splitting and clamping the same tightly around a smooth steel primary tank still provides sufficient migration without the need to form protrusions or projections on either the outer surface of the primary tank or the inner surface of the secondary container. The inventor has found that there are sufficient surface imperfections or irregularities inherent in the steel primary tank and fiberglass reinforced plastic secondary container to allow migration without special care to provide any predetermined or intentional surface roughness or spacing therebetween. Although the total force on the bottom and sides of the cylinder is high, the actual pressures in these locations is insufficient to close the myriad of small cavities and channels that result even with the use of a male mold and inner tank with a smooth surfaces The elimination of the need for spacers or spacing materials, as well as simplifying fabrication and reducing costs, has the additional advantage of providing immediate support to the fiberglass secondary storage container by the immediately adjacent outer wall of the steel primary storage tank, thereby making the handling of the finished double wall tank much easier, and making the secondary containment capsule thereof much less susceptible to damage In essence, any small gaps between the inner and outer walls which result due to imperfections in the fiberglass outer shell and/or the steel inner shell will normally be of a dimension within the elastic limits of the fiberglass outer wall, so that concentrated handling loads in those regions will only cause elastic deflection of the fiberglass until supported by the steel inner tank, thereby avoiding damage in situations that would cause damage to the outer shell of tanks fabricated in accordance with U.S. Pat. No. 4,744,137.

In the sections to follow, further details of the construction of "smooth on smooth" tanks in accordance with FIG. 2, as well as methods for providing texturing if desired, are described.

2. Formation of the Middle Section

Figure 3C:
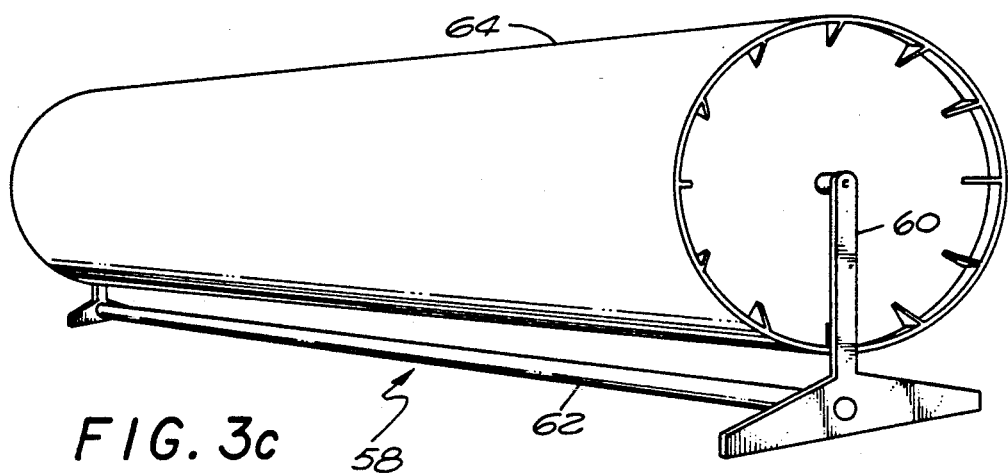
FIG. 3c illustrates another preferred male mold means.

Now referring to FIG. 3c, the preferred form of male mold means 58 for fabricating the middle section 26 of the secondary container 24 may be seen. The mold means comprises a drum-like structure 64 supported for rotation about its axis on supports 60 at each end thereof coupled together by a frame member 62 to provide the support structure therefor. In addition, drive means (not shown) is provided to rotate the male mold 64 about its axis on the support structure, preferably at a controllable rate. While the mold 64 itself may be fabricated in various ways, a convenient method of fabrication is to fabricate the same in much the same manner as one would fabricate the steel inner tank 22 of FIG. 2, namely by cutting, bending and welding various sections of steel to form the tank-like mold structure. In so doing, one obtains a surface smoothness characteristic of rolled sheet steel. At the welds themselves any excess material is ground off, and any depressions are filled in so that a substantially smooth cylindrical outer surface on the male mold is achieved. While the mold surface need not be highly polished nor perfectly cylindrical, a reasonably smooth and cylindrical surface is desired, as the same will better facilitate the application of a mold release to the male mold, and will make easier the splitting and removal of the center section 24 therefrom after the molding thereof. In that regard, the diameter of the male mold should be slightly larger than the diameter of the steel tank 22 (see FIG. 2) over which it will be placed, as after splitting as shown in FIG. 2, it is desired that the free edges at the split at least slightly overlap to allow the clamping and tightening of section 26 onto the steel inner tank 22, as subsequently described.

In the preferred method of fabricating the double wall tanks of the present invention, the male mold 64 is coated with an appropriate wax (mold release) either by rolling or rubbing or both. In general, the wax will tend to even further smoothen the mold surface in at least much of the mold surface, making the same relatively glossy to the eye. In applying the wax, care is taken to be sure to adequately cover all parts of the mold, and it is for this reason that any high points on the mold, such as welds, etc., should be ground down to a smooth condition before using the same, as a wax coating on high points tends to rub thin or rub off when the wax is applied and rubbed out, resulting in the resin adhering to the mold at those spots. Depressions are also undesired and should be filled in, not only because of the same not easily being properly waxed, but further because the same may result in protrusions on the inner surface of the molded central section 26, preventing the surface of the fiberglass shell from being clamped flat against the adjoining surface of the steel primary tank 22 and causing a point of possible extreme stress concentration during the handling and installation of the finished double wall tank. In that regard, when the wax is properly rubbed out on a suitably smooth male mold, it has been found that the mold may be reused up to three times before requiring rewaxing.

In general, when the mold is waxed and rubbed out, on occasion there are portions thereof where the layer of wax is thicker than necessary, in which case the same may streak slightly. While minor streaking is permissible, it is also not necessary for migration in the finished double wall tank. Streaking and any other surface roughness however, should be held to a relative minimum, as the inner surface of the molded middle section 26, as well as the outer surface of the steel primary tank, should be at least sufficiently smooth so that the parts fit together well enough for any localized gaps therebetween to close as a result of external forces by the elastic deflection of the fiberglass without cracking or other damage to the same.

After the mold 64 is prepared, the middle section 26 is laid up in three separate passes of a chopper gun. The weight of the roving used in each pass is the measure used in determining the total thickness of the middle section laminate. As each pass is chopped, it is rolled out and then allowed to cure to the touch. All burrs or rough areas are then sanded so that the next pass can be chopped on and rolled out smoothly. After the last pass has been applied and detailed, the entire surface of the laminant is sprayed with catalyzed resin to give the middle section a resin rich exterior. The interior surface, of course, is essentially a duplication of the smooth typography on the male mold member, as in general the layer of wax will be sufficiently thin so that the smooth mold surface is replicated as the inner surface of the molded middle section 26.

Instead of utilizing a male mold 64 to form the central section 26 for the secondary container 24, the central section may be formed by use of a flat mold (not shown). In this instance, the flat sheet is preferably tightly secured about the primary tank 22 prior to its complete curing. The same technique, of course, may be practiced using commercially available sheet material formed of a reinforced curable plastic resin, perhaps multiple sheets being joined as required to make up a complete central section Also using this or any of the other techniques disclosed herein, one could alternatively use a central section thickness which is less than the desired thickness of the completed secondary containment capsule, such as by way of example, 25 percent of the ultimately desired thickness, with the additional thickness being built up after the assembly of the incomplete secondary containment capsule onto the primary tank. It is preferred however, that the various fiberglass parts be initially fabricated to their full thickness, as the same tends to eliminate duplication of processing steps, and the split central section or central section sheets, while being very rigid in small pieces, have sufficient flexibility because of the size of the central section to flex as required for assembly, as subsequently described herein.

3. Formation of the End Caps

Figure 4:
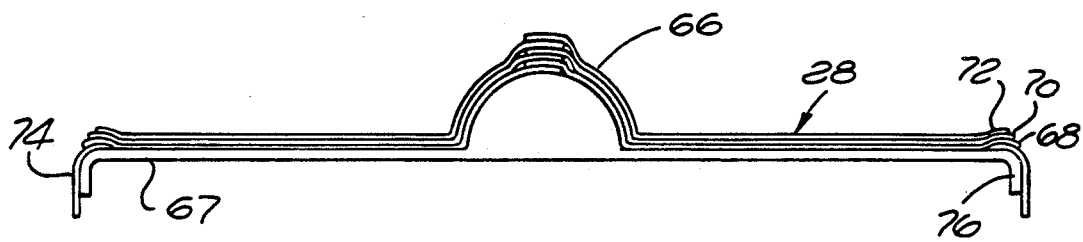
FIG. 4 is a cross-sectional view of an end cap of the present invention having a rounded portion formed thereon for the monitor tube.

Referring now to FIG. 4, the formation of an end cap 28 with a rounded portion 66 for a monitor tube is illustrated. As was the case with the middle section 26, the end caps may be initially molded to about 25% of their finished thickness, but are preferably molded to their final thickness As before, wax is utilized to prevent the fiberglass laminate from permanently bonding to the mold 67, the wax being wiped or rolled on. The end cap 28 is laid up in three separate layers 68, 70, 72, with the exception of a vertical flange 74 which consists of only one layer. The end cap 28 layup operation is started by first hand laying one layer 74 of mat strips around the vertical flange 76 of the mold, the strips being saturated with resin and catalyst just prior to their application. Following this step, layer 68 of mat is applied to the top of the mold 67. After all air bubbles have been rolled out, the first layer 68 is allowed to cure to the touch Next, a second layer 70 and a third layer 72 are applied to the top of the mold 67, allowing partial curing to occur between layers When the finished end cap 28 has cured enough to handle, excess laminate is trimmed from around the bottom edge of the mold 67. The piece is then detailed, removed from the mold 67 and stored in a flat position so as to prevent warping.

If desired, inward projecting protrusions or other surface texturing may be formed on the end caps to enhance migration and/or define leakage collection pockets by putting the inverse pattern thereof on the end cap molds, as the end caps are not as susceptible to damage during the handling of the finished double wall tank as is the central section of the secondary containment capsule. However adequate migration of leakage is obtained without using such protrusions or other texturing, and end caps with any substantial inward protrusions are much more susceptible to damage during installation, such as being rapped hard with a backhoe or by larger stones violently hitting the same when filling around the ends of the tank. Therefore smooth or near smooth end caps are preferred.

4. Assembly

After the middle section 26 has substantially cured, a longitudinal cut is made along one side of the middle section, typically at the 9 o'clock position, thus forming longitudinal edges at the cut. Normally, the middle section 26 will release and one edge will drop to the ground as soon as this cut is made. The mold is then rotated so the cutting slot is at 6 o'clock, and vacuum pods are attached to middle section pickup points.

Figure 5:
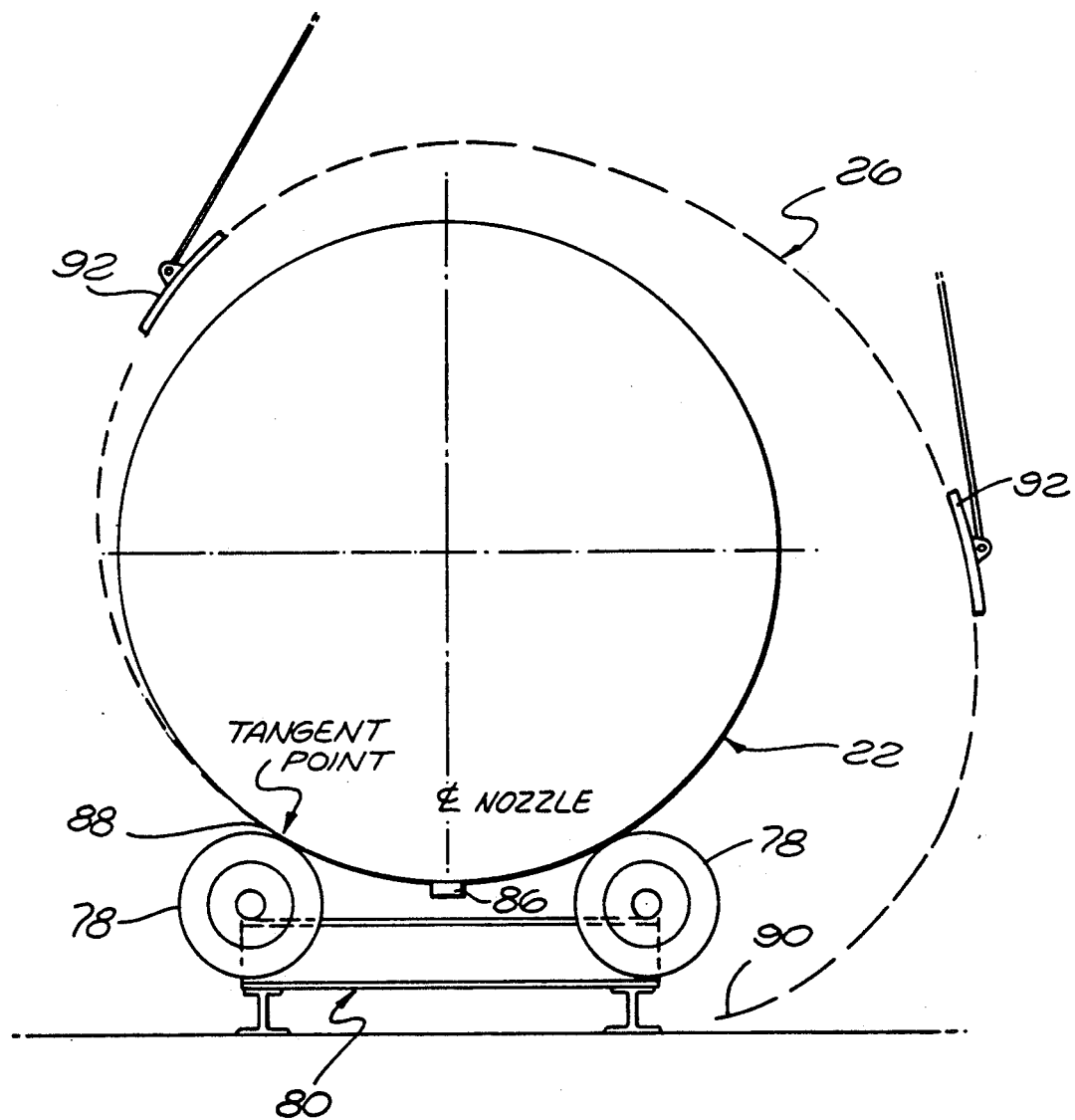
FIG. 5 is a view illustrating the application of the middle section onto the primary tank.

Referring now to FIG. 5, the middle section 26 is then gently lifted from the mold and moved onto the primary tank 22 which has been placed on turning rollers 78 of a roller assembly, generally designated 80. The roller assembly 80 includes two rows of longitudinally spaced rollers 78. The steel primary tank 22 is positioned as shown in FIG. 5 with its nozzles 86 oriented at 6 o'clock. The middle section 26 is lowered so that one edge 88 jams into the tangent point illustrated. In that regard, while the fiberglass in small slab form is very rigid and clearly not flexible, pieces as large as the middle section 26 exhibit substantial flexibility because of their size, and are easily flexed adequately to be placed in position around the primary tank 22. The primary tank 22 is then rotated counterclockwise, and the vacuum pods 92 are released.

Figure 6A:
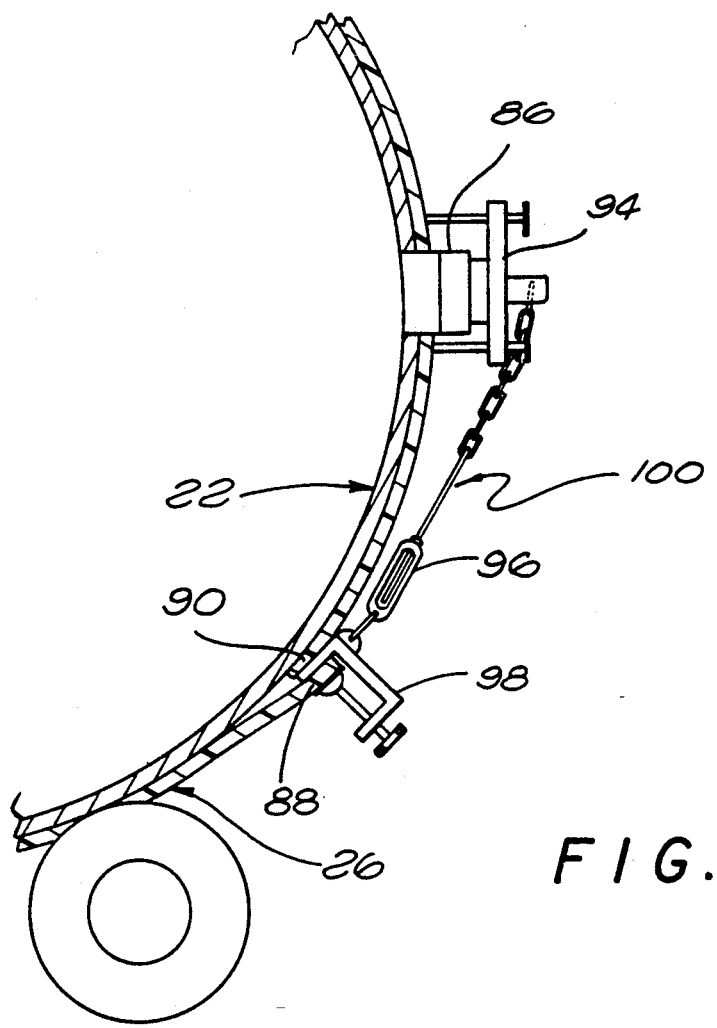
FIG. 6a illustrates the use of a turnbuckle-clamp assembly for tightening the middle section.

The primary tank 22 is then rotated counterclockwise until the nozzles 86 appear at the 3 o'clock position, as illustrated in FIG. 6a. Openings in the middle section laminate corresponding to nozzle locations are formed to accommodate the nozzles 86. Clamps 94 are then installed around the periphery of each nozzle 86 and the openings between each of the nozzles 86 and the middle section 26 are puttied. Turnbuckles 96 and clamps 98 are then attached as shown in FIG. 6a, a turnbuckle-clamp assembly being designated generally as 100. Three assemblies 100 are preferably utilized, one assembly 100 located at the middle nozzle and one of each at the end nozzles (e.g. See FIG. 2). One clamp 98 of each assembly 100 is attached to edge 88 of the middle section 26 and the other clamp 94 is attached to the adjacent nozzle 86.

The turnbuckle-clamp assemblies 100 are then hand tightened When the curable putty around the nozzles has sufficiently cured, the tank is rotated clockwise 180°. The turnbuckles 96 are again hand tightened. The tank is rotated clockwise 180° three more times, and each time the turnbuckles 96 are hand tightened. The rotation of the tank in the clockwise direction self-tightens the middle section 26 onto the steel primary tank 22, thereby aiding the action of the turnbuckles.

Figure 6B:
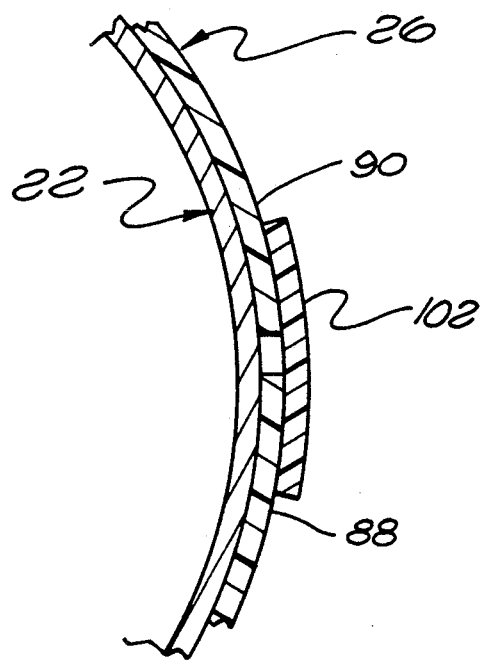
FIG. 6b illustrates a portion of the longitudinal seam of the middle section tacked with fiber-reinforced mat.

Any portions of the middle section 26 which extend axially beyond the length of the primary tank 22 are then trimmed back. At least one of the overlapping longitudinal edges 88, 90 of the middle section 26 is also trimmed back between the turnbuckle-clamp assemblies with the outer edge thereof being deflected inward so that the edges 88, 90 join in a smooth fashion. The resulting longitudinal seam is then tacked using impregnated fiberglass mat 102, as illustrated in FIG. 6b. (Mat is also applied around the periphery of the nozzles. The nozzle area may be further prepared by application of silicone seal and trimming of the excess fiberglass from around the nozzles.)

Figure 7:
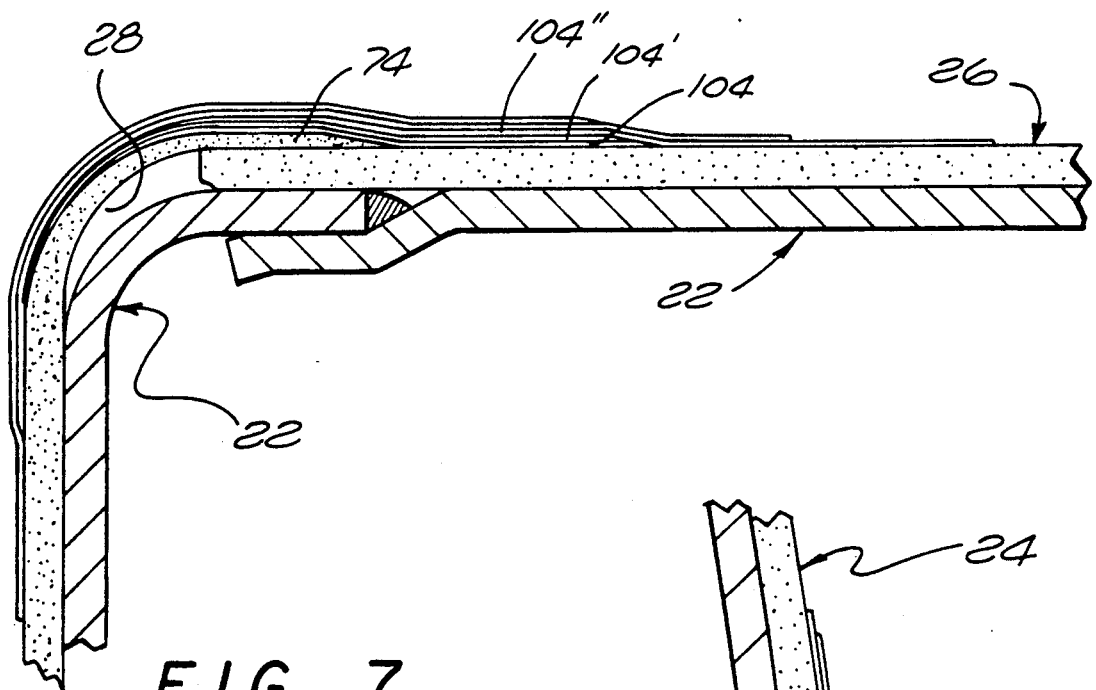
FIG. 7 is a cross-sectional view of a portion of an end cap/middle section joint, illustrating the use of fiber-reinforced matting.

Next, the end caps 28, 30 are positioned and the end cap flanges 74 are slid over the ends of the middle section 26. With the end cap 28 or 30 held snugly against the steel end of the primary tank 22, the flanges 74 (see FIG. 4) are fastened to the end of the middle section 26 they overlap, by, for example, equidistantly spaced sheet metal screws. A vacuum may be applied to the inside of the primary tank 22 during this procedure, thereby removing any outward end bulging and allowing easier end cap assembly. The end cap / middle section joints and the longitudinal seam joint are then sand blasted and polyethylene tape is applied around the end cap / middle section joint to prevent air penetration from the back side of the fiberglass weld. Impregnated mat strips are then laid over each end cap / middle joint, preferably with offset layers 104, 104', 104'', etc , as shown in FIG. 7.

Referring now to FIG. 8, the assembly is then rotated so that the longitudinal seam 106 is brought to the 3 o'clock position. It is re sand blasted, and mats 108, 108', 108'', etc. are placed over the joints. Final assembly may entail, for example, vacuum testing, application of a sump ring and the like.

5. Texturing for Specialized Applications

Figure 9:
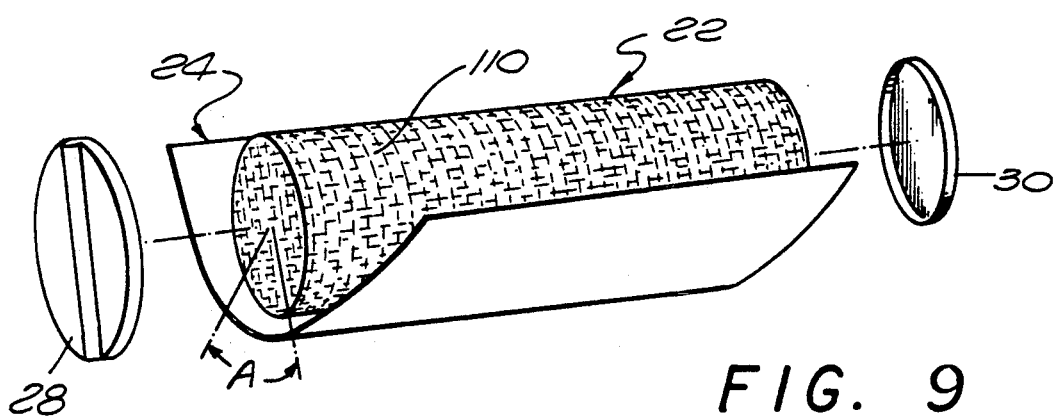
FIG. 9 is a perspective view, illustrating the use of a primary storage tank textured from a diamond plate.

As noted, test data indicates that sufficient fluid migration between the smooth primary tank and the secondary containment capsule walls occurs even in the absence of a separator or deliberately formed protrusions on the inside of the secondary containment wall or on the outside of the primary containment wall. However, it may still be desirable, for some specialized applications where enhanced flow is required, to utilize a primary tank 22 with a textured outer surface or to texture the secondary container 24 after the secondary container 24 has been molded Referring now to FIG. 9, the outer surface 110 of the primary tank 22 is shown provided with diamond plate steel that incorporates a textured pattern on its surface. Other suitable patterned materials might be utilized to form the desired roughness on the outer surface. Such texturing in these specialized instances provides substantial and well defined interconnected spaces or cavities to allow the migration of fluid between the two walls.

Figure 10:
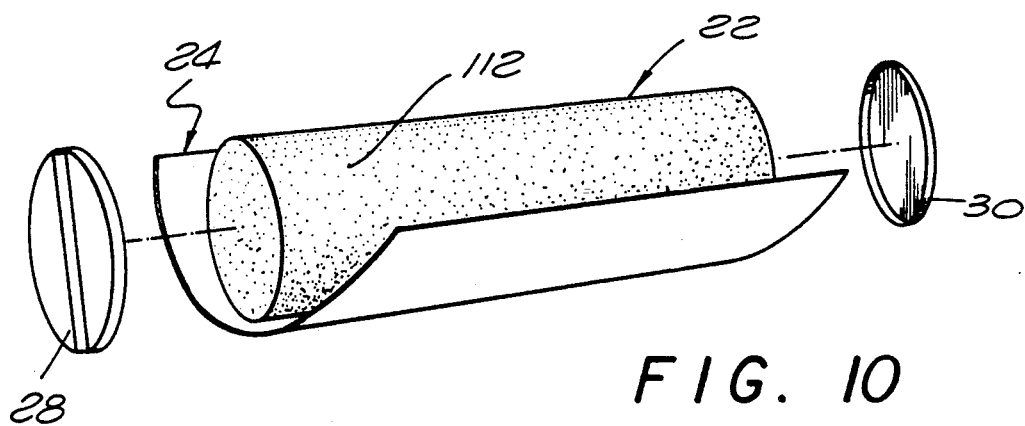
FIG. 10 is a perspective view, illustrating the use of a primary storage tank textured by application of a resin-based material, application of a metal-based substance, or abrasive blasting.

Referring now to FIG. 10, a desired roughness on the outer surface 112 of the primary tank 22 may alternatively be provided by application of a resin-based material, application of a metal-based substance, or abrasive blasting. Application of a resin-based substance may include applying solid particles, for example, crushed rock, pea gravel, metal pellets, crushed shells (particularly walnut shells), or glass beads. In the instance where the primary tank 22 is textured by abrasive blasting, such blasting may be provided by utilization of sand, steel shot and grit, natural slags, garnet, etc. The outer surface 112 may be blasted prior to assembly of its individual components or after it is assembled, using manual or automated blasting methods, as are well known in the industry. With respect to use of a resin-based texture, the primary tank 22 may be textured by applying resin, with or without texture additives, depending on the specialized application and texture of the resin used.

Figure 11:
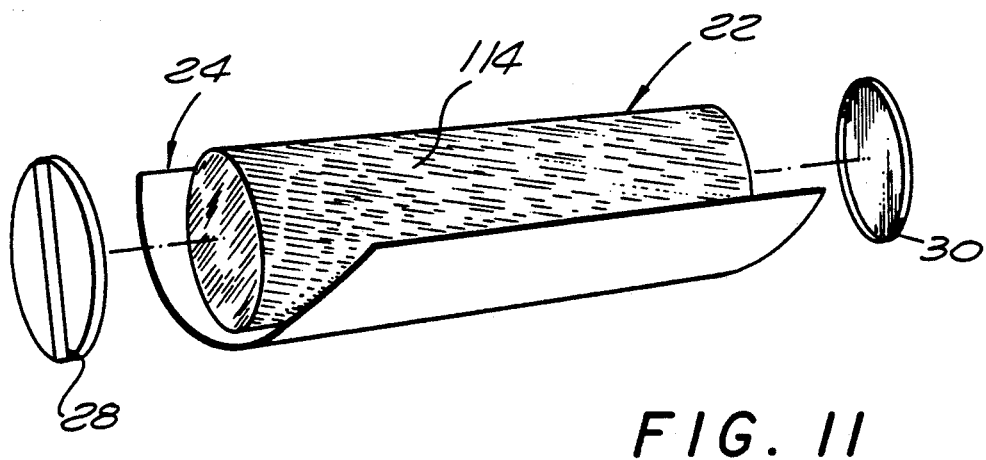
FIG. 11 is a perspective view, illustrating the use of a primary storage tank which is textured by abrasive machining, pickling or etching.

Referring now to FIG. 11, the outer surface 114 of primary tank 22 may alternatively be abrasively machined or textured by pickling or etching or by treating the primary tank 22 outer surface 114 with compounds that will yield surface textured characteristics which enhance fluid migration. In the instance where a metal-based substance is applied, such an application may be provided by a flame-sprayed metallizing process, spot welding or similar methods of depositing metal onto a metal surface. Abrasive machining may be accomplished by mechanical means, such as grinding with abrasive discs or conventional machining equipment, or other commercially known power tool cleaning methods.

In all of the above applications regarding texturing, it is noted that the entirety of the primary tank 22 need not be textured. For example, for certain applications, only the lower sections (e.g., angle A in FIG. 9) of the primary tank 22 may be textured.

As noted, in specialized applications, it may be desired to texture the inner surface of the secondary container 24 after that container has been molded. In this instance, to enhance fluid migration in the interstices between the outer surface of the primary tank 22 and the inner surface of the secondary container 24, at least a portion of the inner surface of the secondary container 24 is textured to a desired roughness after the secondary container 24 has cured.

As was described above with respect to the primary tank 22, texturing may be accomplished by applying a texturing agent. The texturing agent may comprise a mixture of polyester resin and glass beads, sand, crushed rock, pea gravel, metal pellets, crushed shells (e.g walnut shells), or other particles such that the mixture will adhere to the interior walls of the secondary container and will form a rough surface. The secondary container 24 may also be textured by abrasive machining or abrasive blasting, as described above with respect to these applications on the primary tank. As in the instance where the primary tank is textured, it is likely that the most desired region for texturing include the lower regions (e.g ., angle A in FIG. 9) of the secondary container 24.

The present invention, even when it involves texturing, has clear advantages over prior art methods which may also involve texturing. These advantages derive from the fact that a single smooth mold is the only mold required to form the longitudinal middle section, whether or not a textured surface is ultimately desired This results in simplified operation and ultimately lower cost.

Obviously, many modifications and variations of the present invention are possible in light of the above teachings. It is therefore to be understood that, within the scope of the appended claims, the invention may be practiced otherwise than as specifically described.

For example, although the above-described procedure utilizing a single sheet for forming a middle section is useful for tanks having less than 15,000 gallon capacity, for tanks with larger capacities, use of a plurality of radially oriented segments, which together constitute a middle section, may be desired. For example, present Applicant typically uses male molds having diameters of 64 inches and 96 inches for tanks in the 675 to 12,000-gallon range. For large tanks, e.g. 15,000 to 20,000-gallon range, present Applicant uses a full section from a 96-inch mold and one-third of a section from a 96 inch mold. Thus, a middle section having an approximate diameter of 128 inches is formed.

Figure 12:
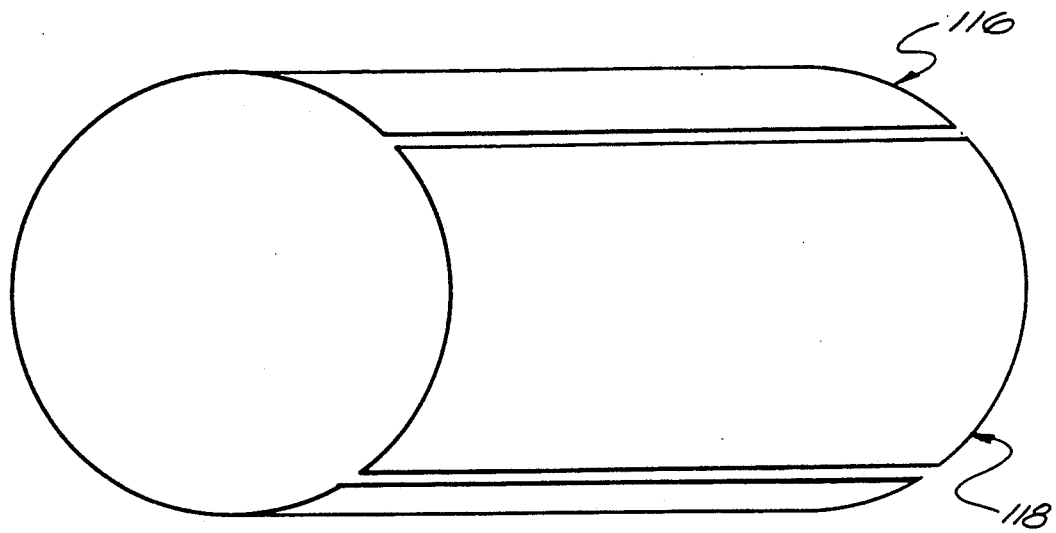
FIG. 12 illustrates an alternate embodiment of the present invention in which a plurality of radially disposed segments are provided which together constitute the middle section.

Such a configuration, using two radially disposed segments, is shown in FIG. 12. The full segment is designated 116, and the one-third segment is designated 118. In applying these segments to the primary tank, a longitudinal edge of segment 118 is placed at the tangent point, as illustrated with respect to FIG. 5 The tank is then rotated counterclockwise so that the shorter segment 118 is upon the rollers. The longer segment 116 is then positioned over the primary tank, and a first seam is fitted and tacked. After the tacks have cured, the tank is again rotated counterclockwise until the nozzles are positioned at 3 o'clock. Holes for nozzles are formed, clamps are installed, turnbuckle-clamp assemblies are applied and the second seam is fitted and tacked, as described above with respect to the previous embodiment. Thereafter the seams are finished as previously described.

Figure 13:
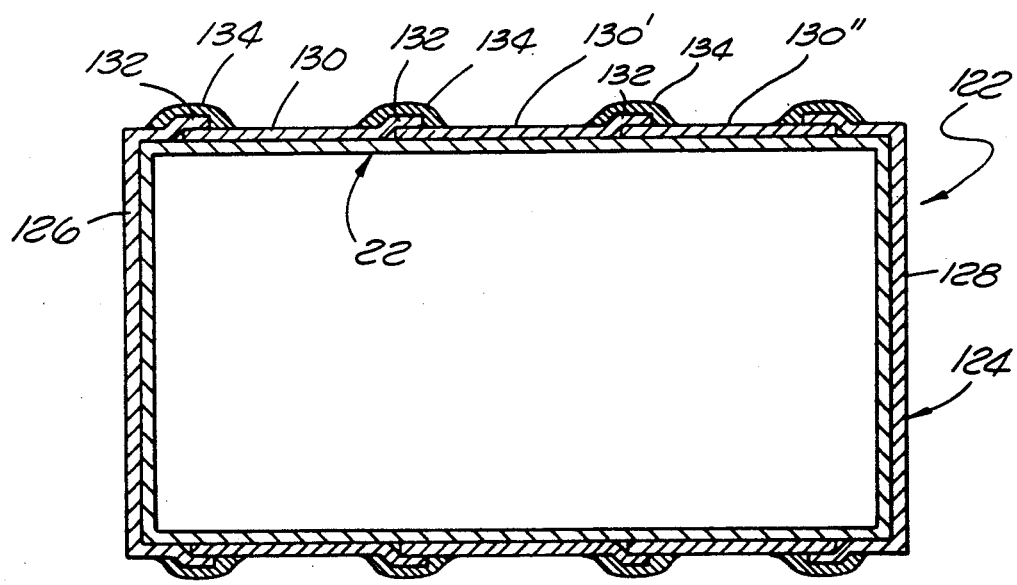
FIG. 13 illustrates an alternate embodiment of the present invention in which a plurality of axially disposed segments are provided which together constitute the middle section.

FIG. 13 illustrates yet another alternate embodiment of the present invention, generally designated 122, in which the secondary container, designated generally as 124, is formed by two molded end caps 126, 128 and a plurality of axially disposed segments 130, 130', 130", which together constitute the middle section. Each of the end caps 126, 128 and axial segments 130, 130', 130" may be preformed, as in the previous embodiments, by, for example, applying fiberglass to a male mold. Use of a plurality of smaller sized segments, as compared to the full middle sections of the previous embodiments, provides easier formation and easier assembly to the primary tank 22. In addition, smaller molds and mold rotating devices can be used. Each segment 130, 130', 130", may include a lip 132 that overlaps the edge of an adjacent segment, thereby forming a lap joint. Alternatively, adjacent segments may be simply butted. In any event, after adjacent segments have been mounted on primary tank 22, fiberglass in the form of mats 134 or chopped fibers and resin can be applied over the lips 132 (or butts) to form a joint between adjacent capsule segments. It is noted that although the end caps have been illustrated as having flat surfaces or having a rounded portion for a monitor tube, they may alternately be constructed as hemispheres, be dish-shaped, or formed in other shapes to provide structural support.

Figure 14:
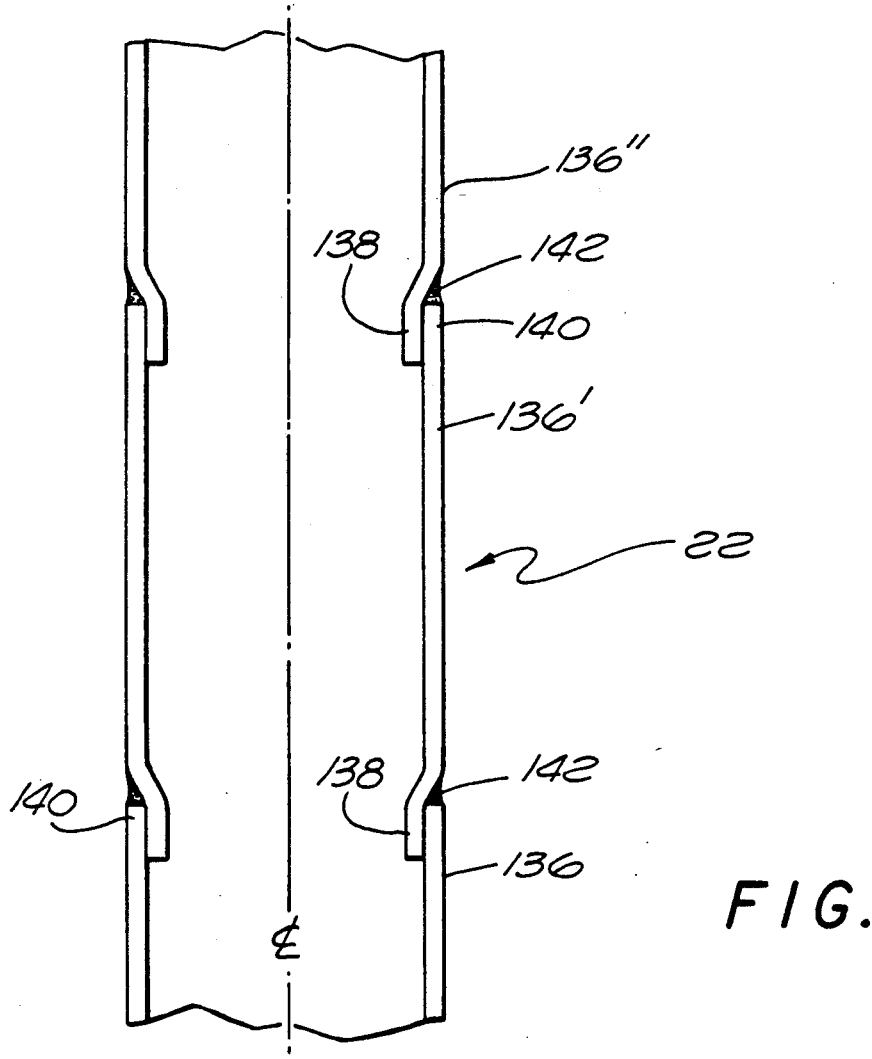
FIG. 14 is a cross-sectional view of a portion of a primary tank fabricated from a plurality of axially spaced apart longitudinal segments forming axially spaced circumferential grooves.

Referring now to FIG. 14, a cross-section of a portion of an embodiment of a primary tank 22 is illustrated.

The primary tank 22 includes a plurality of longitudinally extending segments 136, 136', 136",... each having a lip 138 that overlaps the edge 140 of an adjacent segment. (In this figure the relative proportions of the diameter of the tank 22 and the lips 138 have been altered to emphasize the structures described herein.) The segments 136, 136', 136",... are preferably welded at locations 142. Thus, a plurality of axially spaced circumferential grooves are formed on the fully fabricated primary tank 22.

Figure 3D:
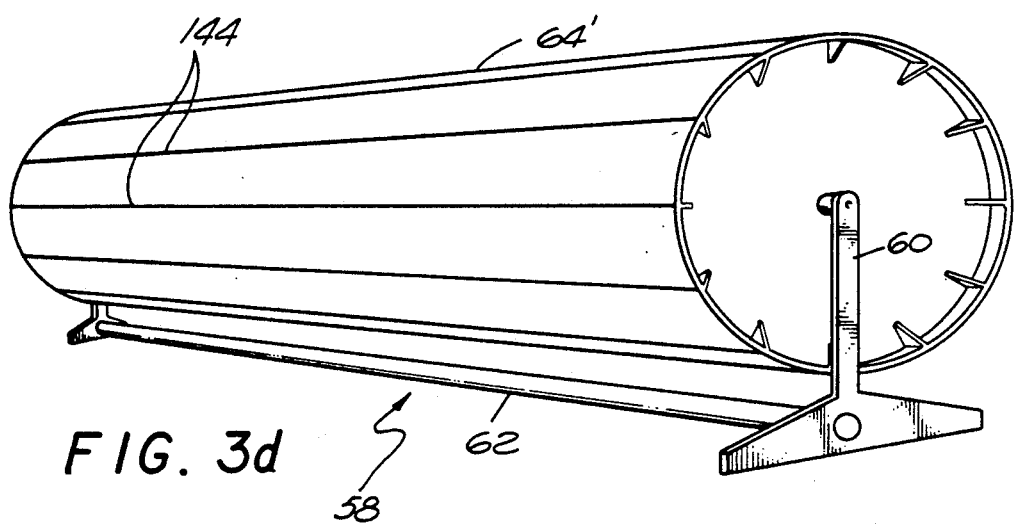
FIG. 3d illustrates another preferred male mold means having a plurality of creased edges.

The embodiment of the primary tank 22 described in FIG. 3d is particularly useful when used with the male mold 64', illustrated in FIG. 3d. Male mold 64' includes a plurality of circumferentially disposed edges or creases 144.

Figure 15:
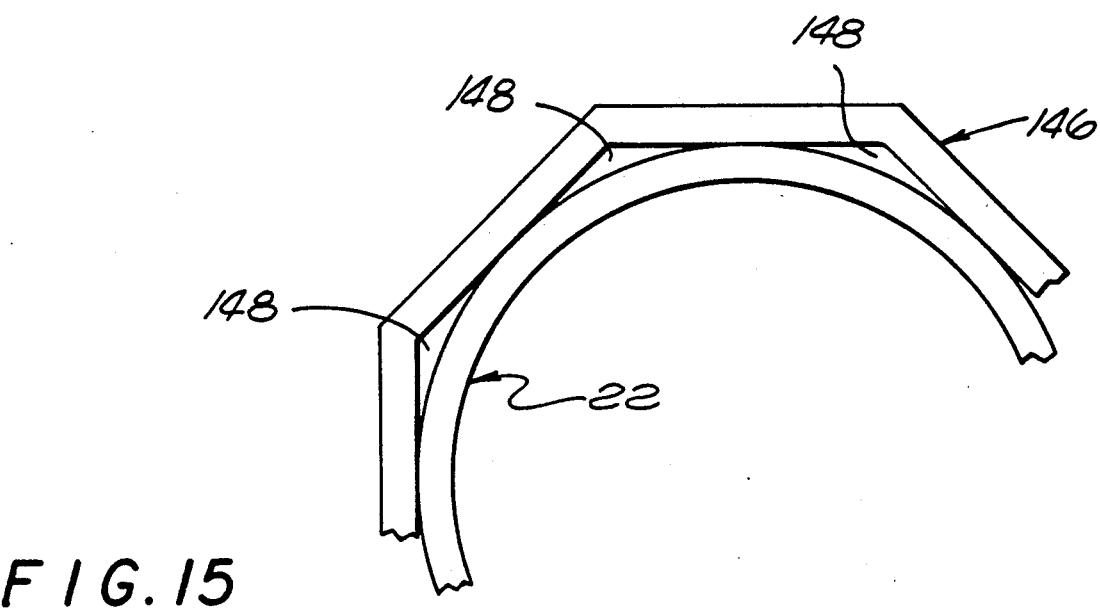
FIG. 15 is a cross-sectional view of an embodiment of the present invention utilizing a middle section formed by the male mold of FIG. 3d and the primary tank of FIG. 14.

Referring now to FIG. 15, when a primary tank 22 is formed, as described with reference to FIG. 14, and utilized with a middle section 146 which results from the use of a male mold 64', as described with reference to FIG. 3d, the resulting structure includes a plurality of a criss-crossing interstitial channels. (The cross-section shown in FIG. 15 shows the longitudinal channels 148 formed by the resulting creases in the middle section 146; however, the grooves formed at locations 142 in the primary tank 22 are not illustrated.) Use of the criss-cross pattern of channels provides for transference of fluids in the longitudinal channels 148, through the circumferential grooves 142, and to the bottom of the tank assembly, for enhanced leak detection capability.

What is claimed and desired to be secured by Letters Patent of the U.S. is:

1. A double walled underground fluid storage tank assembly that allows a fluid medium to migrate between the walls when the fluid medium penetrates either wall, comprising:
   a steel fluid storage tank having a substantially smooth outer surface;
   a secondary fluid storage container constructed from fiberglass reinforced plastic having a substantially smooth inner surface, said second fluid storage container being first formed and then tightly secured about said outer surface of said steel fluid storage tank so that said smooth inner surface of said secondary container is in tight abutment and in intimate contact with said smooth outer surface of said steel tank.

2. The double wall underground fluid storage tank assembly of claim 1 wherein said steel fluid storage tank comprises a generally cylindrical tank and wherein said secondary fluid storage container comprises at least one cylindrical section having a substantially smooth inner surface being first formed and then tightly wrapped around said cylindrical tank, and first and second end caps, each securely bonded to a respective end of said cylindrical section.

3. A double wall underground fluid storage tank assembly having a primary containment for fluid storage and secondary containment surrounding the primary containment, comprising,
   (a) a steel fluid storage tank having a substantially cylindrical central section and steel end caps, one welded to each end thereof, said substantially cylindrical central section having a substantially smooth outer surface over the entire tank exterior, said steel fluid storage tank forming said primary containment for fluid storage;
   (b) a secondary fluid storage container constructed from fiberglass reinforced plastic having at least one cylindrical section having a substantially smooth inner surface over the entire interior of said section, said cylindrical section being first formed and then tightly wrapped around said cylindrical tank, and first and second end caps, each securely bonded to a respective end of said cylindrical section, said secondary storage container being secured about said steel tank such that said smooth inner surface of said cylindrical section of said secondary container is in tight abutment and in intimate contact with said smooth outer surface said steel tank.

4. The underground fluid storage tank of claim 3, wherein said cylindrical section of said secondary container includes two longitudinal edges joined together at a longitudinal seam.

5. The underground fluid storage tank of claim 4, wherein said cylindrical section of said secondary container is secured to said steel tank by applying fiber-reinforced matting at said longitudinal seam.

6. The underground fluid storage tank of claim 4, wherein said end caps of said secondary container are secured to said cylindrical section by applying fiber-reinforced matting to the joint between said end caps and said cylindrical section.

7. A double wall underground fluid storage tank assembly having a primary containment for fluid storage and secondary containment surrounding the primary containment, comprising;
   (a) a steel fluid storage tank having a substantially cylindrical central section and steel end caps, cne welded to each end thereof, said substantially cylindrical central section having a substantially smooth outer surface over the entire tank exterior, said steel fluid storage tank forming said primary containment for fluid storage;
   (b) a secondary fluid storage container constructed from fiberglass reinforces plastic having at least one cylindrical section having a substantially smooth inner surface over the entire interior of said section, said cylindrical section being first formed and then tightly wrapped around said cylindrical tank, and first and second end caps, each securely bonded to a respective end of said cylindrical section, said secondary storage container being secured about said steel tank such that said smooth inner surface of said cylindrical section of said secondary container is in tight abutment and in intimate contact with said smooth outer surface of said steel tank; and,
   (c) access means extending through said secondary fluid storage container to a region between said steel fluid storage tank and said secondary fluid storage container adjacent the bottom of said steel fluid storage tank, said access means being a means through which leakage through either of the primary and secondary containments may be detected.

* * * * *